United States Patent [19]
Crocker et al.

[11] Patent Number: 5,502,756
[45] Date of Patent: Mar. 26, 1996

[54] REMOTE TEST CALL UNIT AND SERVICE

[75] Inventors: Michael A. Crocker, Pickerington, Ohio; V. R. Gopala Rao, Holmdel; Meah A. Shahabuddin, Lincroft, both of N.J.; Barbara H. Stark, Alpharetta, Ga.

[73] Assignee: AT&T Corp., Murray Hill, N.J.

[21] Appl. No.: 967,650

[22] Filed: Oct. 28, 1992

[51] Int. Cl.⁶ .............................. H04M 1/24; H04M 3/42
[52] U.S. Cl. ............................................. 379/29; 379/213
[58] Field of Search .................... 379/14–18, 211, 379/212, 272, 273, 201, 220, 221, 10, 13, 16, 34, 309, 127, 142; 370/14, 16, 265, 266

[56] References Cited

U.S. PATENT DOCUMENTS

| | | | |
|---|---|---|---|
| 4,311,882 | 1/1982 | Johner et al. | 379/16 |
| 4,847,890 | 7/1989 | Solomon et al. | 379/67 |
| 5,161,181 | 11/1992 | Zwick | 379/67 |
| 5,249,222 | 9/1993 | Pinard | 379/220 |

Primary Examiner—Stephen Chin
Assistant Examiner—Kevin Kim
Attorney, Agent, or Firm—Thomas A. Restaino

[57] ABSTRACT

Reliability of telephone service is increased by providing a test call apparatus configured to launch a test call to a preselected telephone number in response to a call from a remote location requesting that the test call be placed. The test call apparatus launches the test call as if the call were being made from the user-supplied originating area code, exchange, or phone number. The test call apparatus then bridges the requesting call and the test call to facilitate analysis of the routing of the test call.

12 Claims, 4 Drawing Sheets

REMOTE TEST CALL UNIT AND SERVICE

TECHNICAL FIELD

This invention relates to methods and apparatus for initiating test telephone calls and, more particularly, to testing the routing of telephone calls.

BACKGROUND OF THE INVENTION

Many businesses subscribe to toll-free, "800 number" telephone service to attract customers. Using 800 numbers, customers can call an 800 number subscriber free of charge to transact business. As the 800 number may be the only way for a prospective customer to contact the subscriber, the reliability and proper operation of a subscriber's 800 number is often crucial to the operation of the subscriber's business. Moreover, misdirected and improperly terminated customer telephone calls can annoy prospective customers who may go elsewhere to purchase goods and services.

As more advanced 800 number services become available to subscribers, the routing of 800 number telephone calls becomes increasingly complex and the risk of error increasingly great. For example, many advanced 800 number features require that multiple accesses be made to databases to properly route a call. Before completing such a call, a database must be accessed to determine what special call processing is required. A second database is then accessed to assign a routing number to the call. The increasing complexity of 800 number call routing and of 800 number databases makes it increasingly more difficult to provide reliable 800 number service.

Despite the ever-increasing complexity of 800 number service, there is no efficient means for testing the routing of 800 number calls. Nor is there a means for subscribers to directly test for themselves, without operator assistance, the operation of their 800 number service.

SUMMARY OF THE INVENTION

Reliability of telephone service is increased by providing a test call apparatus configured to launch a test call to a preselected telephone number in response to a call from a remote location requesting that the test call be placed. The test call apparatus launches the test call as if the call were being made from the user-supplied originating area code, area code and exchange, or phone number. The test call apparatus then bridges the requesting call and the test call to facilitate analysis of the routing of the test call.

In an exemplary embodiment of the invention, a user calls the test call apparatus and provides to the test call apparatus a number to be dialed, such as an 800 number, and the originating area code, originating area code and exchange, or entire originating phone number that the test call apparatus is to emulate. The user can request the test call from any remote location. The test call apparatus uses the information provided by the user to initiate a test call to the specified 800 number as if the call was originating from the emulated number so as to evaluate the routing of calls from a predetermined location (i.e., the emulated number). Upon launching of a call, the test call apparatus bridges the call from the user to the test call apparatus with the call from the test call apparatus to the 800 number.

DETAILED DESCRIPTION

To provide a better understanding of the present invention, the typical arrangements in telephone networks for muting telephone calls, and, more particularly, for routing calls to "virtual" telephone numbers, such as toll-free or 800 number telephone calls, will be described. Virtual telephone numbers are telephone numbers that are not associated with a particular telephone line, but rather require a translation of some son prior to routing the telephone call. In a typical arrangement, a calling party who dials an 800 number to reach an 800 number subscriber is first connected to the local exchange switch of the calling party's local exchange carrier (LEC). The local exchange switch then routes the call to an interexchange switch of the appropriate interexchange carrier (IXC). The IXC assigns a routing number to the call. The call is then routed through its IXC network to another interexchange switch, to another LEC, and to the premises of the 800 number subscriber, as determined by the assigned routing number.

Figure 1:
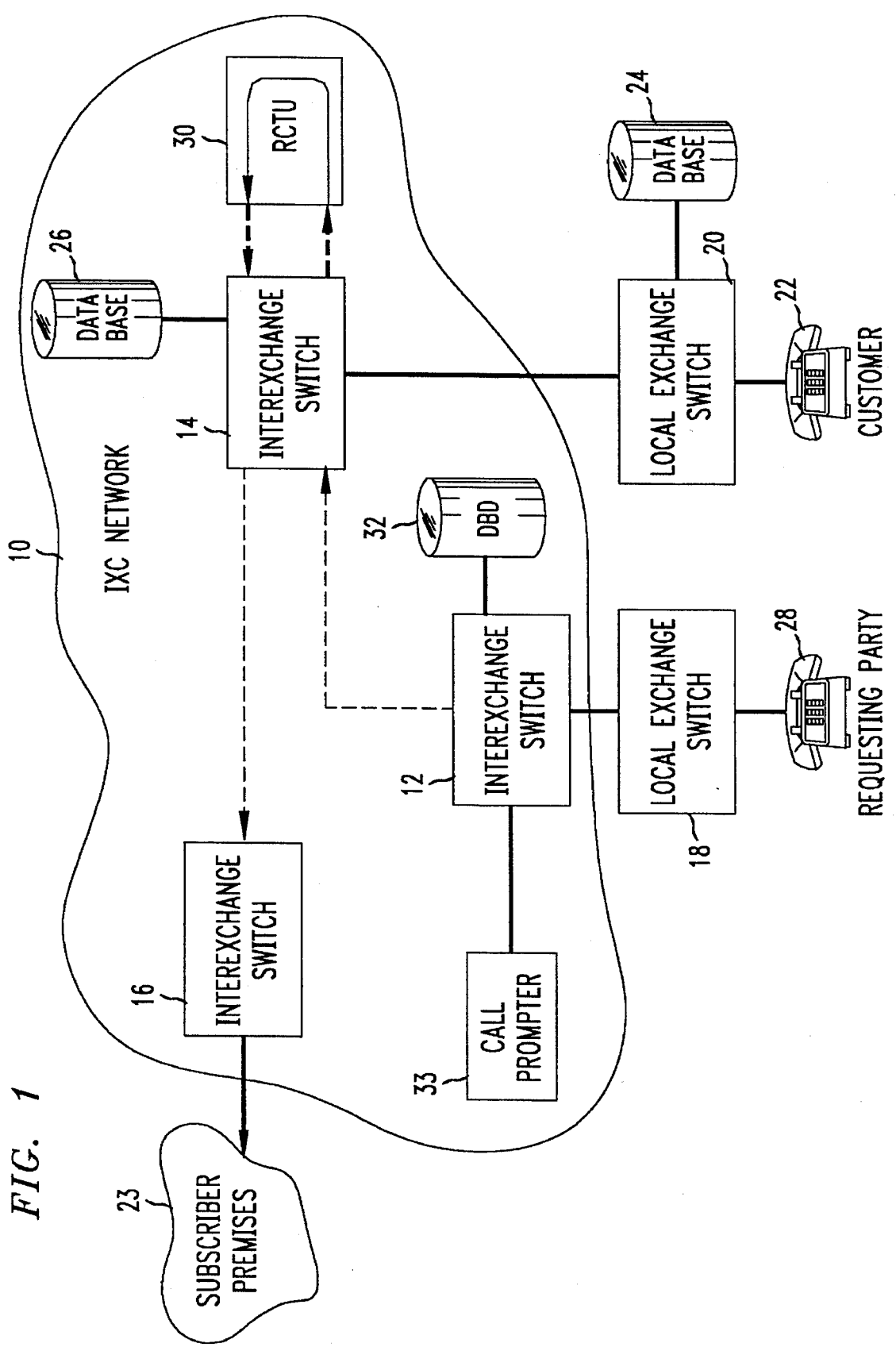
FIG. 1 is a simplified schematic diagram of a long distance telephone system, including a remote call testing unit that is constructed in accordance with the principles of the present invention.

FIG. 1 shows such a telephone network for routing telephone calls between a calling party and an 800 number subscriber. The telephone network includes an IXC network 10 which includes interexchange switches 12, 14, and 16, which are illustratively AT&T 4ESS™ switches. Interexchange switches 12 and 14 are coupled to local exchange switches 8 and 20, respectively. The local exchange switches are illustratively AT&T 5ESS® switches.

A calling party, using telephone 22, dials an 800 number to reach an 800 number subscriber located at a subscriber premises 23. The call is extended from telephone 22 to local exchange switch 20. Local exchange switch 20 compares the dialed 800 number with records from a database 24 to determine which interexchange carder will provide transmission service for the call. Switch 20 then routes the call to the interexchange switch of the appropriate carder, in this instance interexchange switch 14, for long distance service. It will be apparent to one skilled in the art, of course, that telephone 22 could be connected to switch 14 through a private branch exchange (PBX) rather than local exchange switch 20.

Interexchange switch 14 then accesses a database 26 to determine a routing number for the call. Database 26 translates the 800 number into a routing number. As described below, switch 14 may access a second database to determine whether additional processing is required to implement advanced 800 number features. Errors in the database records will result in misdirected or uncompleted calls. Assuming the database is error-free, switch 14 then mutes the call via the IXC network to interexchange switch 16 for routing to the subscriber premises. From switch 16, the call either is routed to subscriber premises 23 directly or to the subscriber premises indirectly through another local exchange switch (not shown), depending on the subscriber's agreement with the interexchange carrier.

Many advanced 800 number features are currently available to subscribers that greatly increase the versatility—and the complexity—of 800 number service. For example, one advanced 800 number feature enables calls to a subscriber's 800 number to be routed to preselected, geographically-dispersed locations on the basis of call volume or time of day. Thus, for example, a company subscribing to this advanced feature can direct that 800 number calls received before 5 P.M. Eastern time automatically be routed to its New York office, while 800 number calls received after 5 P.M. Eastern time automatically be routed to its California office. Another advanced feature permits a subscriber to selectively route calls in response to the caller's Numbering Plan Area ("NPA" or "area code"), NPA and exchange, or entire ten-digit telephone number (often referred to as its "ANI").

As mentioned above with regard to database 26, data errors in the advanced features database would result in incomplete or misdirected calls and, consequently, lost revenue to the 800 number subscriber. Further, data residing only in interexchange switch 14 could be in error. As a result of this, we have recognized the need for an efficient means for testing the routing of telephone calls, and particularly for testing the routing of 800 number calls. We also have recognized the need to emulate launching a test call from a preselected NPA, exchange, or ANI, to permit testing of advanced 800 number features. As used herein, the term "emulate" refers to placing a test call from a remote call test unit (RCTU) that is connected directly to a telecommunications switch, such as an interexchange switch, but providing to the switch information that would be provided had the test call been placed from a specified originating NPA, exchange, or ANI supported by that switch. Typically, when a call is placed from a telephone, the ANI of the calling telephone is provided to the interexchange switch. The RCTU of the present invention, however, in placing a test call, provides to the switch the ANI of the telephone to be emulated rather than information about the RCTU.

In accordance with the invention, the routing path that would be implemented for a call from telephone 22 can be tested from a remote location, such as telephone 28. In particular, a requesting call is placed from the remote location to the interexchange switch 14 serving telephone 22. An RCTU 30 located at interexchange switch 14 receives the requesting call and in response thereto initiates a test call. RCTU 30 places the test call using the same 800 number that would be dialed by the caller at telephone 22, and provides interexchange switch 14 with information required to emulate originating the call from telephone 22.

More particularly, to test the routing that would be implemented for a call, a person requesting a test call (referred to as the "requesting party") places a call from telephone 28, through local exchange switch 18 and interexchange switch 12 to RCTU 30. The requesting call can be placed using, for example, a 900 number (for which the requesting party pays a higher telephone charge) to provide a simple means for billing for the test call service. Interexchange-switch 12 accesses a database 32 to determine to which interexchange switch the call will be routed. Database 32 can invoke a call prompter 33 to facilitate obtaining from the requesting party information needed to identify the RCTU from which to place the test call and to provide switch 12 with instructions for routing the requesting call to the appropriate RCTU. Switch 12 then sends the requesting call to RCTU 30 through network 10 and interexchange switch 14.

RCTU 30 requests from the requesting party the information that the RCTU requires to place a test call. Namely, RCTU 30 requests the 800 number to be dialed and, at a minimum, the originating NPA to be emulated (i.e., the NPA of telephone 22). To perform NPA-based testing, the interexchange switch is provided by RCTU 30 with the originating number (received from the requesting party) of the form NNN-???-????, where NNN is a three-digit number representing the originating NPA and ???-???? represents seven other digits. As described in greater detail below, RCTU 30 also can place test calls using the exchange or entire ANI to emulate an originating number.

RCTU 30 then launches a test call through interexchange switch 14 to the subscriber premises. Interexchange switch 14 processes and routes the test call in the same manner as it would any other call. Interexchange switch 14 checks database 26 to determine the routing number for the call. Interexchange switch 14 may also access an additional database for information regarding advanced 800 number features to which the 800 number subscriber subscribes.

If the test call from RCTU 30 is interrupted, for example, as a result of an error in information provided by database 26 to switch 14, the requesting party is informed of the call interruption. The requesting party can then notify the subscriber's long-distance carder so that the error causing the service interruption can be corrected promptly.

If, on the other hand, the test call from RCTU 30 is completed, the requesting party at telephone 28 can speak with a person at the other end of the telephone line. As described below, a test call is said to be completed "successfully" or "unsuccessfully."

Where the test call is "successfully" completed, that is, the connection is made with the intended party, no further action is required. If the test call had been requested as a routine check of the requesting party's 800 number service, the call is considered a success. However, if the test call had been requested in response to a report of a problem, the requesting party can report that the routing problem has occurred before the interexchange switch, i.e., with the local exchange switch, and that the local exchange carder must be contacted.

Where the test call has been completed but is "unsuccessful," that is, a connection is made with a person other than the intended party, the requesting party can question the answering party to obtain information useful in determining what went wrong in routing the test call. The requesting party can then provide this information to the long-distance carder to effect any corrections required.

Figure 2:
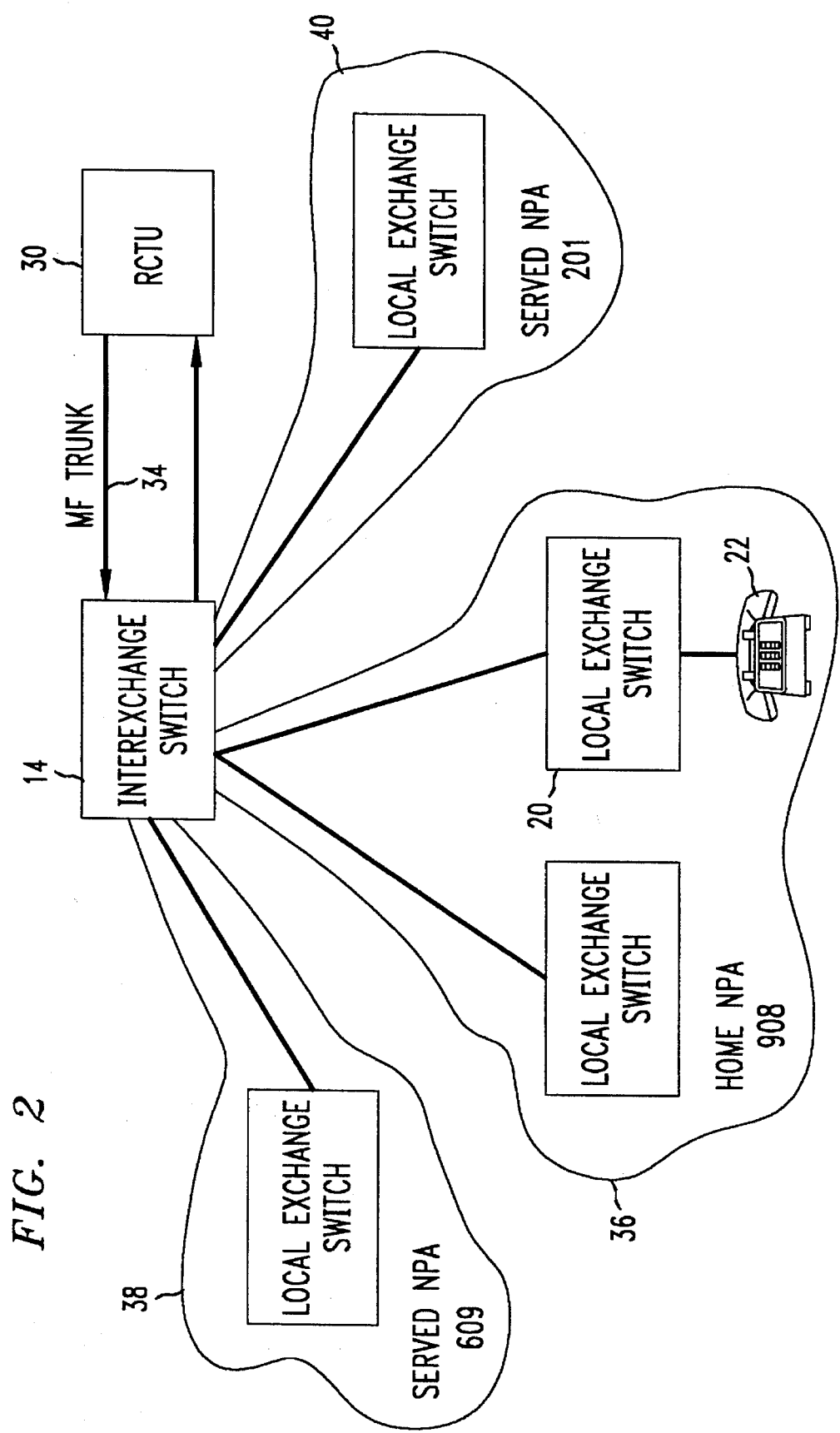
FIG. 2 is a simplified schematic diagram of the remote call testing unit and interexchange switch of FIG. 1.

Many interexchange switches serve more than one NPA. In particular, each interexchange switch serves a "home" NPA for which it is the primary interexchange switch, and one or more "served" NPAs for which it is a secondary interexchange switch. For example, FIG. 2 shows interexchange switch 14 and the geographical areas (NPAs) served by that switch, including its home NPA 36 and served NPAs 38 and 40. Within each NPA, one or more local exchange switches connect subscribers to interexchange switch 14. As shown in FIG. 2, RCTU 30 preferably is coupled directly to switch 14. This enables RCTU 30 to communicate directly with the switch to emulate originating a test call from one of the NPAs served by interexchange switch 14.

In accordance with another principle of the invention, RCTU 30 preferably is coupled with interexchange switch 14 by a multi-frequency (MF) trunk 34. More particularly, a test system constructed in accordance with the invention preferably utilizes Feature Group C or Feature Group D signaling on MF trunks, rather than dual tone multi-frequency (DTMF) signaling, for placing outgoing test calls from RCTU 30.

Use of MF signaling for outgoing calls from RCTU 30 to interexchange switch 14 provides advantages that are not available with DTMF signaling. MF signaling utilizes structured data formats to effect data transfers under software control, permitting efficient communications between equipment within a telecommunications network. For example, in Feature Group C signaling, a local exchange switch typically is controlled through software to provide the interexchange switch with the number dialed and with the NPA of the calling telephone. Similarly, in Feature Group D signaling, the local exchange switch typically provides the interexchange switch with the number dialed and with the full 10-digit ANI of the calling telephone. DTMF signaling, however, lacks the structure and software control of MF signaling. Data provided by a caller (e.g., via telephone keypad entry) are transmitted directly to the switch.

Use of an MF trunk and MF signaling enables RCTU 30 to emulate originating test calls from any of the NPAs served by switch 14, regardless of whether the NPA is a home NPA or served NPA. This capability is not readily available if RCTU 30 places outgoing calls through interexchange switch 14 via a DTMF trunk. RCFU 30 typically can only emulate calls originating from the home NPA of switch 14 when outgoing calls are placed via a DTMF trunk. RCTU 30 can, however, receive requests for test calls via a DTMF trunk without a degradation of performance.

MF trunk 34, when used with Feature Group D signaling, also permits RCTU 30 to perform exchange-based testing and ANI-based testing that could not be performed using a DTMF trunk. To perform exchange-based testing, as in NPA-based testing described above, the requesting party must provide the RCTU with an originating number of the form NNN-XXX, where NNN and XXX are three-digit numbers representing the NPA or area code and the exchange of the calling number to be emulated, respectively. To perform ANI-based testing, the requesting party must provide to RCTU 30 the full ANI of the calling number to be emulated. Namely, the requesting party must provide RCTU 30 with an originating number of the form NNN-XXX-YYYY, where NNN, XXX, and YYYY are digits representing the area code, the exchange, and the line number, respectively, of the calling number to be emulated. Exchange-based testing permits testing of advanced 800 number services which route calls differently on the basis of the caller's exchange. Similarly, full ANI-based testing enables one to test the operation of 800 services which route calls differently on the basis of the caller's ANI.

Figure 3:
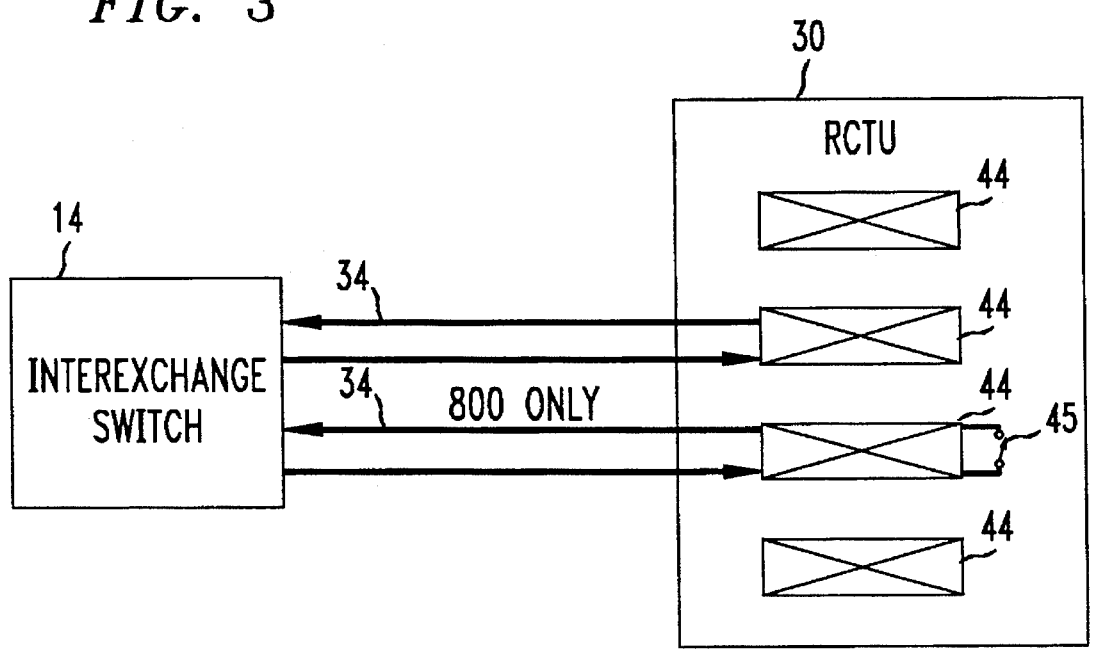
FIG. 3 is a schematic diagram of the remote call testing unit of FIG. 1 illustrating customer mode operation.

Referring now to FIG. 3, RCTU 30 preferably includes two or more line cards 44, each of which is configured to independently receive an incoming call requesting a test call, place an outgoing test call in response to the received request, and bridge the incoming and outgoing calls. The line cards enable a single RCTU to process simultaneously several test call requests. In view of this disclosure, line cards suitable for use with the present invention can easily be constructed by one of ordinary skill in the art.

In an exemplary embodiment of the invention, RCTU 30 operates in one of two operating modes. In a fast mode, referred to herein as the "work center" mode, the RCTU can launch test calls to 800 numbers, 900 numbers, or any other valid telephone number. In the other mode, referred to as the "customer" mode, the RCTU permits test calls to be launched only to 800 numbers. Customer mode provides a means for preventing fraud. By limiting the outgoing calls from an RCTU to only 800 numbers, the RCTU prevents the bridging of an inexpensive request call to more expensive telephone calls such as 900 number calls. RCTU 30 preferably includes a hardware or software switch, illustratively shown as switch 45, on each of line cards 44 to selectively configure the line card to operate in one of the two operating modes.

Figure 4:
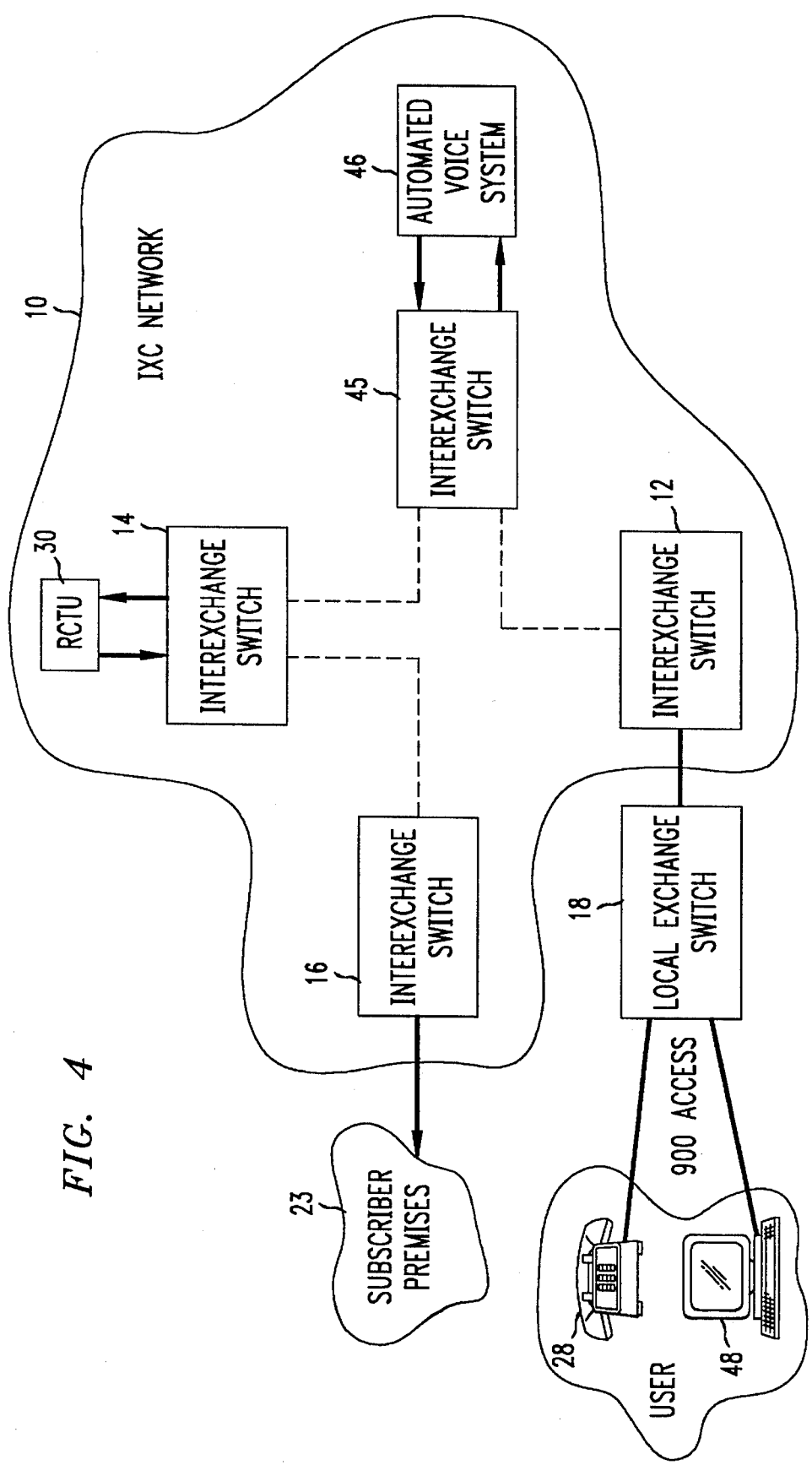
FIG. 4 is a simplified schematic diagram showing an alternative method for accessing the remote call testing unit of the invention.

FIG. 4 shows an alternative network arrangement for using the test call methods and apparatus of the invention. The arrangement of FIG. 4 uses a automated voice system 46, such as the AT&T Conversant® system, within the long distance network to interact with a caller to obtain the information required by RCTU 30.

When the requesting party requests a test call via telephone 28, a fast call is established from interexchange switch 12 to automated voice system 46 through interexchange switch 45 via long distance network 10. Automated voice system 46 responds to the requesting party's call by placing a call to RCTU 30. Automated voice system 46 then obtains from the requesting party the information required by RCTU 30 to complete the test call. Automated voice system 46 bridges the incoming and outgoing calls to effectively couple the requesting party with RCTU 30. RCTU 30 then launches the test call to the selected 800 number to be tested, as previously described. If the test call is completed, RCTU 30 bridges its incoming and outgoing calls so as to connect the requesting party with the subscriber premises. If, however, the test call cannot be completed, automated voice system 46 communicates with the requesting party to relay the results of the test call.

FIG. 4 also shows a computer 48 coupled to local exchange carder switch 18. Computer 48 may be, for example, a personal computer, or a more powerful workstation. Computer 48 may be used to automate a string of test calls. For example, computer 48 may be programmed to cause a particular RCTU to initiate test calls to a predetermined 800 number, with each call emulating a different exchange serviced by the interexchange switch to which the RCTU is connected. Data communication protocols for transferring information between computer 48 and RCTU 30, without voice prompting, can be provided to increase the efficiency and operating speed of the test system.

It will be understood that the foregoing is merely illustrative of the principles of the invention, and that various modifications can be made by those skilled in the art without departing from the scope and spirit of the invention. For example, it is within the scope of the invention to configure an interexchange switch to perform all or part of the functionality described for the RCTU. Moreover, although RCTU 30 is described herein as being coupled to an interexchange switch, one skilled in the an will appreciate that the RCTU alternatively could be coupled to a local exchange switch.

We claim:

1. A method for testing the routing that would be implemented for a telephone call that originates at a first telephone station having a first telephone number and is placed to a second telephone station having a second telephone number, the method comprising the steps of:

receiving at a remote call test unit (RCTU) a first telephone call from a third telephone station having a third telephone number;

placing a test call from the remote call test unit to the second telephone station in response to receiving the first telephone call, said test call emulating the originating of a call from the first telephone station to the second telephone station, wherein said emulating comprises supplying with the test call at least a portion of the first telephone number; and interconnecting the first call with the test call.

2. The invention as defined in claim 1 wherein the first telephone number includes a three-digit number representing a numbering plan area (NPA), the three-digit number being received during the first telephone call.

3. The invention as defined in claim 1 wherein the fast telephone number includes a six-digit number representing a numbering plan area (NPA) and an exchange, the six-digit number being received during the first telephone call.

4. The invention as defined in claim 1 wherein the fast telephone number includes a ten-digit number representing an automatic number identifier (AND, the ten-digit number being received during the first telephone call.

5. The invention as defined in claim 1 wherein the remote call test unit is coupled to a telecommunications switch via a trunk that permits delivering from the RCTU to the telecommunications switch numbers representing different NPAs.

6. The invention as defined in claim 5 wherein the trunk is a multi-frequency (MF) trunk.

7. The invention as defined in claim 6 wherein the remote call test unit places the test call through the telecommunications switch via one of Feature Group D-type signaling and Feature Group C-type signaling.

8. The invention as defined in claim 1 wherein the step of placing the test call further includes the step of restricting placement of the test call to an 800 telephone number.

9. The invention as defined in claim 1 wherein the second telephone number is an 800 telephone number.

10. The invention as defined in claim 1 further comprising the step of receiving from an automated voice system at least one of the fast and second telephone numbers before placing the test call.

11. A method for use in a telecommunications system of the type in which, in response to the placing of a call to a virtual telephone number, a database is queried to supply a destination telephone number which is a function of said virtual telephone number and at least a portion of an originating telephone number identified for said call, and said call is thereupon routed to said destination telephone number, said method comprising the steps of:

receiving at a test point within said system an incoming call;

prompting an originator of said incoming call to supply, for said incoming call, both a particular virtual telephone number and at least a portion of a dummy originating telephone number via telephone keypad input;

receiving, in response to said prompting, telephone-keypad-originated signals specifying said particular virtual telephone number and said dummy originating telephone number portion; and placing an outgoing call to said particular virtual telephone number and identifying as said originating telephone number portion for that call the received dummy originating telephone number portion, whereby said outgoing call is routed to a destination telephone station as though the outgoing call had originated from a telephone station have a telephone number including said dummy originating telephone number portion.

12. The invention of claim 11 wherein in said placing step said incoming call and said outgoing call are interconnected.

* * * * *

UNITED STATES PATENT AND TRADEMARK OFFICE
CERTIFICATE OF CORRECTION

PATENT NO. : 5,502,756

DATED : March 26, 1996

INVENTOR(S) : M.A. Crocker, V.R. Gopala Rao, M.A. Shahabuddin, B.H. Stark

It is certified that error appears in the above-identified patent and that said Letters Patent is hereby corrected as shown below:

Column 7, claim 3, line 11, "fast" should read --first--.
Column 7, claim 4, line 15, "fast" should read --first--.
Column 7, claim 4, line 17, "AND" should read --ANI)--.
Column 8, claim 10, line 3, "fast" should read --first--.

Signed and Sealed this

Third Day of September, 1996

*Attest:*

BRUCE LEHMAN

*Attesting Officer*     *Commissioner of Patents and Trademarks*